(12) United States Patent
Friebe et al.

(10) Patent No.: US 10,530,273 B2
(45) Date of Patent: Jan. 7, 2020

(54) UNFOLDING BRIDGE, INVERTER HAVING REACTIVE-POWER CAPABILITY, AND POLARITY REVERSING METHOD

(71) Applicant: SMA Solar Technology AG, Niestetal (DE)

(72) Inventors: Jens Friebe, Vellmar (DE); Peter Lahnor, Kassel (DE); Oliver Prior, Marsberg (DE)

(73) Assignee: SMA Solar Technology AG, Niestetal (DE)

( * ) Notice: Subject to any disclaimer, the term of this patent is extended or adjusted under 35 U.S.C. 154(b) by 152 days.

(21) Appl. No.: 15/884,653

(22) Filed: Jan. 31, 2018

(65) Prior Publication Data
US 2018/0152118 A1 May 31, 2018

Related U.S. Application Data

(63) Continuation of application No. PCT/EP2016/068827, filed on Aug. 6, 2016.

(30) Foreign Application Priority Data

Aug. 7, 2015 (DE) .................... 20 2015 104 157 U

(51) Int. Cl.
*H02M 7/5387* (2007.01)
*H02M 1/44* (2007.01)
(Continued)

(52) U.S. Cl.
CPC ....... *H02M 7/53871* (2013.01); *H02J 3/1842* (2013.01); *H02J 3/385* (2013.01);
(Continued)

(58) Field of Classification Search
CPC .... H02M 7/53871; H02M 1/088; H02M 1/42; H02M 1/44; H02M 7/5387;
(Continued)

(56) References Cited

U.S. PATENT DOCUMENTS

| 9,350,269 B2 | 5/2016 | Crookes |
| 9,768,710 B2 | 9/2017 | Oates |
| 9,793,812 B2 | 10/2017 | Firebe |

FOREIGN PATENT DOCUMENTS

| CN | 103208935 A | 7/2013 |
| DE | 102011017601 A1 | 10/2012 |
| DE | 102014101571 A1 | 8/2014 |

OTHER PUBLICATIONS

M Davies, et al, "HVDC Plus—Basics and Principle of Operation Table of Contents", Aug. 10, 2008, Technical Article, Siemens.
(Continued)

*Primary Examiner* — Robert L Deberadinis
(74) *Attorney, Agent, or Firm* — Eschweiler & Potashnik, LLC

(57) ABSTRACT

An unfolding bridge includes a half-bridge with a first input terminal, a second input terminal, and an output terminal, wherein the half-bridge includes a first bridge switch connected between the first input terminal and the output terminal and a second bridge switch connected between the second input terminal and the output terminal. The unfolding bridge also includes a further half-bridge which includes a first further bridge switch connected between the first input terminal and a further output terminal and a second further bridge switch connected between the second input terminal and the further output terminal. A switch controller for operation of the bridge switches is designed such that a connection of the output terminals with the input terminals via the bridge switches is reversed at a zero crossing of an alternating current flowing at the output terminals. In a current path between the input terminals via the first bridge switch, the output terminals, and the second further bridge switch, and in a current path between the input terminals, via the first further bridge switch (S5), the output terminals, and the second bridge switch, at least one reverse voltage (Continued)

compensator is arranged. The reverse voltage compensator is configured to shift the electrical potential of the respective input terminal with respect to the respective output terminal, between which the reverse voltage compensator is arranged, by a compensation voltage dropped across the reverse voltage compensator, and thereby compensates for a reverse voltage that is oriented against the flow of current in the current path in which the reverse voltage compensator is arranged.

26 Claims, 8 Drawing Sheets

(51) Int. Cl.
*H02J 3/18* (2006.01)
*H02J 3/38* (2006.01)
*H02M 1/088* (2006.01)
*H02M 1/42* (2007.01)
*H02M 1/00* (2006.01)

(52) U.S. Cl.
CPC ............. *H02M 1/088* (2013.01); *H02M 1/42* (2013.01); *H02M 1/44* (2013.01); *H02M 7/5387* (2013.01); *H02M 2001/007* (2013.01); *Y02E 40/22* (2013.01)

(58) Field of Classification Search
CPC .. H02M 2001/007; H02J 3/1842; H02J 3/385; Y02E 40/22
See application file for complete search history.

(56) References Cited

OTHER PUBLICATIONS

Davidson C. C., et al, "Innovative Concepts for Hybrid Multi-Level Converters for HVDC Power Transmission", International Conference on AC and DC Power Transmission, Oct. 19, 2010.
International Search Report dated Dec. 8, 2016 in connection with International Application No. PCT/EP2016/066827.

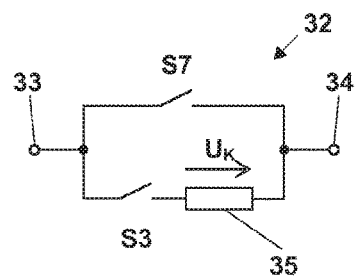
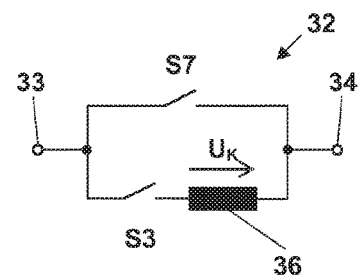
Fig. 2a                Fig. 2b
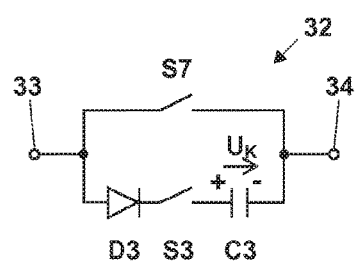
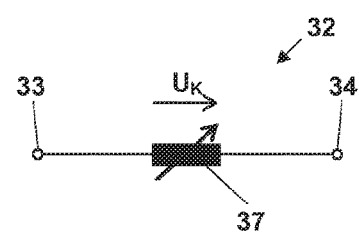
Fig. 2c                Fig. 2d
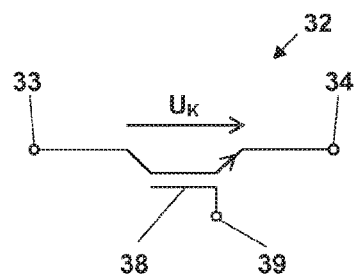
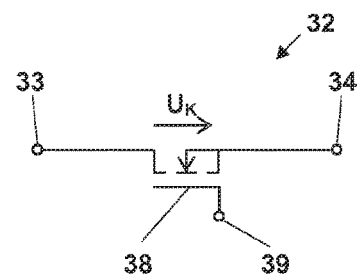
Fig. 2e                Fig. 2f

UNFOLDING BRIDGE, INVERTER HAVING REACTIVE-POWER CAPABILITY, AND POLARITY REVERSING METHOD

CROSS-REFERENCE TO RELATED APPLICATIONS

This application claims priority to PCT Patent Application Number PCT/EP2016/068827, filed on Aug. 6, 2016, which claims priority to German Patent Application Number DE 20 2015 104 157.8, filed on Aug. 7, 2015, which are hereby incorporated by reference in their entirety.

FIELD

The disclosure relates to an unfolding bridge, an inverter with such an unfolding bridge, and a polarity-reversing method.

BACKGROUND

A method for the operation of an inverter having reactive power capability which comprises a polarity-reversing method is known from DE 10 2014 102 000 B3. The inverter having reactive power capability operated under application of the known polarity-reversing method comprises a bidirectional DC/DC converter, a link circuit and an unfolding bridge, wherein the two poles of the link circuit are connectable in alternation to two terminals of an AC output by means of the unfolding bridge in order to alternate the polarity of the AC output with respect to the link circuit. This alternation takes place at the zero crossing of an alternating voltage present at the AC output. In the presence of a phase difference between the alternating current and the alternating voltage at the AC output, the direction of a current flowing through the link circuit is also reversed when the polarity of the AC output with respect to the link circuit is reversed between the half-waves of the alternating voltage using the unfolding bridge. If the alternating current lags the alternating voltage at the AC output, the AC output is disconnected from the link circuit during the reversal of the direction of the current flowing through the link circuit, and a freewheeling path is made available between the two terminals of the AC output. For this purpose, the two terminals of the AC output are short-circuited, in particular through bridge switches of the unfolding bridge. In order to reverse the direction of the current flowing through the link circuit, the link circuit is charged by a current flowing through a storage choke device of the DC/DC converter, and is discharged in the opposite direction after this current has decayed. In the case of alternating current leading the alternating voltage at the AC output, these measures taken when changing the polarity of the AC output with respect to the link circuit are not necessary, since for this purpose a DC voltage present at the link circuit acts as the driving force.

While the method known from DE 10 2014 102 000 B3 does avoid the high distortion factor that is associated with other methods for the operation of an inverter with reactive power capability with a DC/DC converter, a link circuit and an unfolding bridge, it nevertheless requires a bidirectional DC/DC converter as well as a mutual accurate matching of the link circuit and the storage choke device of the DC/DC converter. It is thus also not possible for a plurality of DC/DC converters to be connected in parallel with the DC link circuit in order, for example, to feed the electrical power of a plurality of photovoltaic generators operated with the respective DC/DC converters at their optimized working point into an AC grid through a common unfolding bridge.

A method for the operation of an inverter having reactive power capability, which comprises a polarity-reversing method is known from CN 103208935 A. The inverter having reactive power capability operated under application of the known polarity-reversing method comprises a bidirectional DC/DC converter, a link circuit and an unfolding bridge, wherein the two poles of the link circuit are connectable in alternation to two terminals of an AC output by means of the unfolding bridge in order to alternate the polarity of the AC output with respect to the link circuit. This alternation takes place at the zero-crossing of alternating current flowing through the AC output. The DC/DC converter comprises a step-down converter connected to a DC voltage source and a step-up converter acting in the opposite direction to it. The step-down converter switch, the step-up converter diode, and a choke used by both converters are each distributed over two components, so that a symmetrical arrangement results. The step-up converter is in this case connected to the DC voltage source through the step-up converter diode, distributed over two diodes, with a polarity opposite to that of the step-down converter. The step-down converter of the DC/DC converter is active when the alternating current and the alternating voltage at the AC output have the same arithmetic sign. If, however, the alternating voltage has its zero crossing before the zero crossing of the alternating current, then the step-up converter of the DC/DC converter is activated instead of the step-down converter. The link circuit is then connected with the DC voltage source via the step-up converter, while the polarity with respect to the connection of the link circuit with the DC voltage source is changed over through the step-down converter.

An inverter having reactive power capability for feeding electrical power of a DC voltage source into an AC grid comprising an unfolding bridge with two parallel half-bridge circuits as inverter bridges is known from document DE 10 2014 101 571 A1, wherein the connection of the output terminals of the unfolding bridge with the input terminals of the unfolding bridge is changed over at the zero crossing of the grid voltage. During a feed of reactive power in time segments of a grid period of the AC grid during which the inverter draws power from the AC grid, a switch of the inverter bridge is operated in such a manner that the electrical power drawn from the AC grid is converted into heat, in that this switch is placed into a linear operating mode, or is clocked dissipatively. In one embodiment, one of the half-bridge circuits provided to connect the output terminals of the unfolding bridge with the input terminals of the unfolding bridge is used for this purpose; in a further embodiment, an additional switch is provided for this purpose, arranged parallel to the half-bridge circuits between the input terminals of the unfolding bridge.

SUMMARY

The disclosure is directed to providing an unfolding bridge with reactive power capability, an inverter and a polarity-reversing method with which a reactive power capability is achieved without increase of the distortion factor, without special requirements on circuits that are already arranged and without matching the unfolding bridge to circuits that are already present.

An unfolding bridge according to the disclosure comprises a half-bridge with a first input terminal, a second input terminal and an output terminal that comprises a first bridge switch connected between the first input terminal and the output terminal and a second bridge switch connected between the second input terminal and the output terminal. The unfolding bridge also comprises a further half-bridge that comprises a first further bridge switch connected between the first input terminal and a second output terminal and a second further bridge switch connected between the second input terminal and the further output terminal. In addition, the unfolding bridge comprises a switch controller for operation of the bridge switches, which is designed such that a connection of the output terminals with the input terminals through the bridge switches is reversed at the zero crossing of an alternating current flowing at the output terminals. At least one reverse voltage compensator is arranged in a current path between the input terminals via the first bridge switch, the output terminals and the second further bridge switch, and in a current path between the input terminals via the first further bridge switch, the output terminals and the second bridge switch.

The reverse voltage compensator is configured to shift the electrical potential of the respective input terminal with respect to the respective output terminal, between which the reverse voltage compensator is arranged, by a compensation voltage dropped across the reverse voltage compensator, and thereby compensates for a reverse voltage between the respective output terminal and the respective input terminal that is oriented against the flow of current in the current path in which the reverse voltage compensator is arranged. The reverse voltage compensator thus in particular permits the output of reactive power via the unfolding bridge according to the disclosure, without the need either for any kind of bidirectional circuit or any kind of circuit directly having reactive power capability upstream of the unfolding bridge, or for a high-frequency drive of the bridge switches of the half-bridges. The reverse voltage compensator in this case shifts the potential of the respective input terminal selectively during periods of time in which a reverse voltage opposite to the flow of current is present, i.e. in periods of time where the arithmetic sign of the alternating current and the alternating voltage between the output terminals differ.

In one embodiment, the reverse voltage compensator is connected in series with one of the bridge switches. The reverse voltage compensator can in this case be arranged between the bridge switch and the respective output terminal; it can, however, equally well be arranged between the bridge switch and the respective input terminal.

If the reverse voltage compensator is arranged between one of the bridge switches and the respective output terminal, it is located simultaneously in both current paths, so that, in principle, one reverse voltage compensator used in common is sufficient for both current paths. If the reverse voltage compensator is, on the other hand, arranged between the bridge switches and the respective input terminal, then it is fundamentally necessary in one embodiment to provide a dedicated reverse voltage compensator for each of the two current paths.

The reverse voltage compensator can be formed as a variable impedance. Such a variable impedance can, for example, be realized by a semiconductor switch operating in linear mode, or as a transistor that is driven to a voltage drop across it having the magnitude of the compensating voltage. In this embodiment, it is advantageous in terms of an operation of the semiconductor switch or of the transistor to provide a reverse voltage compensator in each of the current paths, one each between the first or second bridge switch and the output terminal and one between the first further or second further bridge switch and the further output terminal.

In terms of a use of the lowest possible total number of switches, it is advantageous if the semiconductor switch comprises one of the bridge switches.

In a further embodiment, the reverse voltage compensator comprises a series circuit of an ohmic resistor or a choke and an activation switch, as well as an additional switch connected in parallel with the series circuit. The reverse voltage compensator can in this way be activated selectively in the presence of a reverse voltage by opening the additional switch and closing the activation switch. In this embodiment, a single reverse voltage compensator between one of the bridge switches and the respective output terminal, then located in both current paths, is usually sufficient. In the case of an ohmic resistor for dropping the reverse voltage, however, significant power losses also arise; and with a choke it is necessary to ensure that it does not affect the flow of current to more than the desired extent. In terms of a use of the lowest possible total number of switches, it is advantageous in this embodiment if the additional switch comprises one of the bridge switches.

In a further embodiment, the reverse voltage compensator can also comprise a series circuit of a capacitor that can be charged to the compensation voltage, and an activation switch, with an additional switch connected in parallel with the series circuit. In this embodiment again, a selective activation occurs in the presence of a reverse voltage through opening the additional switch and closing the activation switch. If only one reverse voltage compensator is used, with only one capacitor in common for both current paths, said capacitor must be recharged for each polarity of the reverse voltage that is present. It is therefore advantageous in this embodiment to provide a reverse voltage compensator in each of the current paths. In terms of a use of the lowest possible total number of switches, it is again in this case advantageous if the additional switch comprises one of the bridge switches.

If the activation switch is designed as a semiconductor switch with an inherent antiparallel diode or body-diode, the capacitor of the reverse voltage compensator is still to be connected in series with a discharge blocking diode which prevents its discharge, and with that a decrease of its compensation voltage. Such a discharge blocking diode is not required with an activation switch that blocks bidirectionally when in the open state.

The capacitor can be charged to the compensation voltage by closing the activation switch. This also means that the capacitor continues to charge up when the reverse voltage compensator comes into use. Accordingly, in one embodiment a discharge circuit, which regularly eliminates this additional charging of the capacitor again, is helpfully provided for the capacitor of the reverse voltage compensator. While it is true that, in principle, the discharging of the capacitor can take place through a discharge resistor, it is nevertheless advantageous in one embodiment to discharge the capacitor by charging up some usable link circuit. This can, for example, be a link circuit located on the input side of the unfolding bridge, or a link circuit of an on-board power supply of the unfolding bridge.

The discharge circuit can, specifically, comprise a simple flyback converter for discharging the capacitor.

The discharge circuit can be designed so that it regularly establishes a predetermined basic value of the compensation voltage when the activation switches are open. This means that the discharge circuit regularly establishes the predetermined basic value of the compensation voltage, not that it necessarily does this every time the activation switch is opened. The establishment can in fact also take place with greater intervals. It is true that the predetermined basic value of the compensation voltage is fixed for operating conditions of the unfolding bridge that remain constant and thereby, in particular, for maximum reverse voltages that remain constant, and is for example at least as large as these occurring reverse voltages, but in contrast to this, however, with varying reverse voltages the predetermined base value of the compensation voltage can track the variations of the reverse voltage, and in fact usefully does track them.

In one concrete embodiment, the reverse voltage compensator can for example comprise a first capacitor chargeable to a first compensation voltage which is connected with a first activation switch between the first input terminal and the output terminal, and a second capacitor chargeable to a second compensation voltage which is connected to a second activation switch between the second input terminal and the output terminal. The first and second bridge switches in this case form the additional switches that are opened when the reverse voltage compensator is activated, i.e. when the respective activation switch is closed. The discharge circuit can, in this embodiment, comprise two separate discharge circuits which are each assigned to one of the two capacitors.

If the first capacitor and the second capacitor are arranged, as seen from the output terminal, upstream of the respective component that prevents its discharge when the activation switch is open, the discharge circuit, as seen from the output terminal, can comprise a first input terminal downstream of the first capacitor and a second input terminal downstream of the second capacitor; in total, two input terminals are thus sufficient, between which the two capacitors are connected in series, and through which the two capacitors can be discharged like a single capacitor. It is clear that the input terminals of the discharge circuit must be arranged upstream of the respective component that prevents a discharge of the respective capacitor when the activation switch is open. This component is the respective activation switch itself, if it blocks bidirectionally, or is the respective discharge blocking diode. If the respective activation switch does not block bidirectionally, it can be arranged on any desired side of the respective capacitor and of the respective input terminal of the discharge circuit.

In one embodiment a switch controller for the last-described embodiment of the unfolding bridge is configured to close that one of the bridge switches and that one of the activation switches that are arranged between the output terminal and said one of the input terminals complementarily to one another in each case. This means that it closes at most one of these two switches at any point in time; there can also be points in time at which both of the switches that are arranged between the output terminal and said one of the input terminals are open. As has already been indicated, the bridge switches of the unfolding bridge according to the disclosure are not necessarily provided for higher-frequency clocking. In any event, they can also be closed simultaneously for comparatively short partial periods of time; thus for example, the respective bridge switch can be closed while overlapping with the opening of the associated activation switch, and vice versa.

In a further embodiment, the reverse voltage compensator comprises a full-bridge circuit, to the input switches of which a capacitor is connected, and at whose output terminals the compensation voltage is provided. The full-bridge circuit is operated in this case as an unfolding bridge, whereby the voltage present at the capacitor is applied with alternating polarity to the terminals of the reverse voltage compensator. In this embodiment, a single reverse voltage compensator between one of the bridge switches and the respective output terminal, then located in both current paths, is sufficient.

With the unfolding bridge according to the disclosure, reactive power can be fed into an AC grid without requiring a bidirectional circuit, or a circuit that for its part has reactive power capability on the input side of the unfolding bridge. The unfolding bridge according to the disclosure can, accordingly, be an output-side part of an inverter with reactive power capability. An input-side DC/DC converter can be provided with such an inverter according to the disclosure to form a direct current that pulses in sinusoidal half-waves, which is output as alternating current through the unfolding bridge. The at least one input-side DC/DC converter can be a single-quadrant converter which thus outputs its direct current via a DC link circuit, so that the direct current and the voltage of the DC link circuit always have the same arithmetic sign. The compensation of the reverse voltage according to the disclosure, or the potential shift between the output terminals and the input terminals, nevertheless makes it possible to feed electrical energy through the unfolding bridge into an AC grid in that a phase shift between the alternating current and the alternating voltage occurs, so that alternating current and alternating voltage temporarily have opposed arithmetic signs. During the periods of this opposed arithmetic sign, the alternating voltage that is opposed to the alternating current is compensated with respect to the input of the unfolding bridge by the reverse voltage compensation; in other words, the potential of the input of the unfolding bridge is shifted with respect to its outputs such that, as seen from the input, the direct current always flows in the direction given by the direct voltage applied to the input, even when the alternating current and the alternating voltage at the output have different arithmetic signs.

With the inverter according to the disclosure, a plurality of DC/DC converters at the input side can be connected with their respective outputs to a common DC link circuit. The plurality of DC/DC converters jointly output the direct current, pulsing in half-waves, through this common DC link circuit to the unfolding bridge, which then is combined to the desired alternating current by the unfolding bridge with polarity alternating in half-waves. With the unfolding bridge according to the disclosure, the reverse voltage compensator must therefore only be provided once in common for all the DC/DC converters that are connected. The input-side DC/DC converters must, however, be matched to one another such that they operate synchronously, i.e. output their pulsed direct current simultaneously with the zero crossings at the beginnings and ends of the half-waves of an alternating current that is to be output. This is, however, in any case a basic precondition for feeding the alternating current into an AC grid.

A separate photovoltaic generator, whose working point is defined by the respective DC/DC converter, can be connected to each of the input-side DC/DC converters of the inverter according to the disclosure. The respective DC/DC converter can thus also be used for an MPP tracking, i.e. for a power optimization of the respective photovoltaic generator, in addition to current forming.

As has already been indicated, in one embodiment a switch controller of the inverter according to the disclosure is configured to reverse the connection of the two output terminals of the unfolding bridge to the two input terminals at each zero crossing of the alternating current flowing between the output terminals, and during periods, in which an alternating voltage at the output terminal has a different arithmetic sign from the alternating current, configured to close the activation switch of the reverse voltage compensator instead of the additional switch, or to drive the variable impedance to a voltage drop occurring across it having the magnitude of the compensation voltage. Thus, in those periods of time when the alternating current and the alternating voltage between the output terminals have different arithmetic signs, the potential shift is activated by means of the reverse voltage compensator.

In a polarity-reversing method according to the disclosure for alternately connecting two poles of a DC link circuit with output terminals of an AC output at which an alternating voltage is present, in order to output an alternating current through the AC output with a phase shifted with respect to the alternating voltage, the connection of the output terminals of the AC output with the poles of the DC link circuit is reversed at a zero crossing of the alternating current, and the AC output with the same arithmetic sign of the alternating current and the alternating voltage is connected directly to the DC link circuit, whereas with mutually opposed arithmetic signs of the alternating current and the alternating voltage, are connected through a reverse voltage compensator to the DC link circuit. The reverse voltage compensator in this case shifts the electrical potential of the pole of the DC link circuit with respect to the output terminal with which the pole is connected via the reverse voltage compensator, by a compensation voltage dropped across it. With the aid of this method, reactive power can be output at the AC output, although a direct current is flowing via the DC link circuit, and a direct voltage is present at the DC link circuit, i.e. direct current and direct voltage in this case have arithmetic signs that are always the same, or at least not different.

The reverse voltage compensator can, in particular, be arranged and designed in a way described in connection with the unfolding bridge according to the disclosure. For the polarity-reversing method according to the disclosure, however, it is only relevant that the AC output is connected via the reverse voltage compensator with the DC link circuit selectively when the arithmetic sign of the alternating current and of the alternating voltage are opposed to one another. The reverse voltage compensator can for this purpose be formed in any desired manner in the connection between the alternating current output and the DC link circuit, for example also through an only partially closed bridge switch or an additional current valve that is only partially opened when the arithmetic signs of the alternating current and the alternating voltage are opposed to one another, connected in series with a bridge switch or an output terminal. Such a partially closed bridge switch can be a semiconductor switch operating in linear mode. Such an only partially opened current valve can be a normally conducting transistor that is driven to a desired voltage drop and thus represents a variable impedance. Such a variable impedance can then be driven to a voltage drop occurring across it having the magnitude of the compensation voltage. The voltage drop arising over the reverse voltage compensator having the magnitude of the compensating voltage can in this case also be adaptively adjusted to a reverse voltage present between one of the poles of the DC link circuit and one of the output terminals.

A capacitor of the reverse voltage compensator can also be charged to a compensation voltage for the reverse voltage compensation. In particular, a first capacitor of the reverse voltage compensator can be charged to a first compensation voltage between the one pole of the DC link circuit and one of the output terminals of the AC output, and a second capacitor of the reverse voltage compensator can be charged to a second compensation voltage between the other pole of the DC link circuit and the one of the output terminals of the AC output. The two capacitors are charged by the current flowing through the capacitor from the DC link circuit to the alternating current output. At the same time this means that the capacitor continues to be charged up when the reverse voltage compensator comes into use. This means that the voltage present across the respective capacitor always rises until the voltage over the two capacitors reaches the maximum voltage of the DC link circuit. For the reverse voltage compensation, however, a compensation voltage across each of the capacitors is sufficient that is equal to the maximum alternating voltage with the opposite arithmetic sign to the alternating current that occurs at the AC output. A compensation voltage greater than this would cause unnecessary potential steps in the DC link circuit with respect to the AC output when the reverse voltage compensator is activated. It is therefore helpful that the capacitors are regularly discharged back to a predetermined base value of the first and the second compensation voltage.

Advantageous developments of the disclosure emerge from the claims, the description, and the drawings. The advantages of features and of combinations of pluralities of features mentioned in the description are purely exemplary, and can be employed alternatively or cumulatively without the advantages necessarily having to be achieved by embodiments according to the disclosure. Without in this way changing the object of the attached claims, the following applies to the disclosed content of the original application documents and of the patent: further features are to be found in the drawings—in particular the illustrated relative arrangements to one another, as well as their operative connections. The combination of features of different embodiments of the disclosure or of features of different claims is also possible in ways that differ from the chosen references of the claims, and is hereby encouraged. This also relates to such features as are illustrated in separate drawings or are referred to in their description. These features can also be combined with features of different claims. Equally, features described in the patent claims for further embodiments of the disclosure can be omitted.

The features referred to in the claims and the description are to be understood, in terms of their numbers, in such a way that precisely this number, or a larger number than the said number, is present, without the requirement for the explicit use of the adverbial phrase "at least". Thus if, for example, one element is being spoken of, this is to be understood such that precisely one element, two elements or more elements are present. These features can also be supplemented by other features, or can be the only features constituting the respective product.

The reference signs contained in the claims do not represent a restriction on the scope of the subjects protected by the claims. Their purpose is merely to make the claims easier to understand.

BRIEF DESCRIPTION OF THE DRAWINGS

The disclosure is further explained and described below with reference to preferred embodiments represented in the figures.

FIGS. 2a-2g show various embodiments of reverse voltage compensators.

DETAILED DESCRIPTION

Figure 1A:
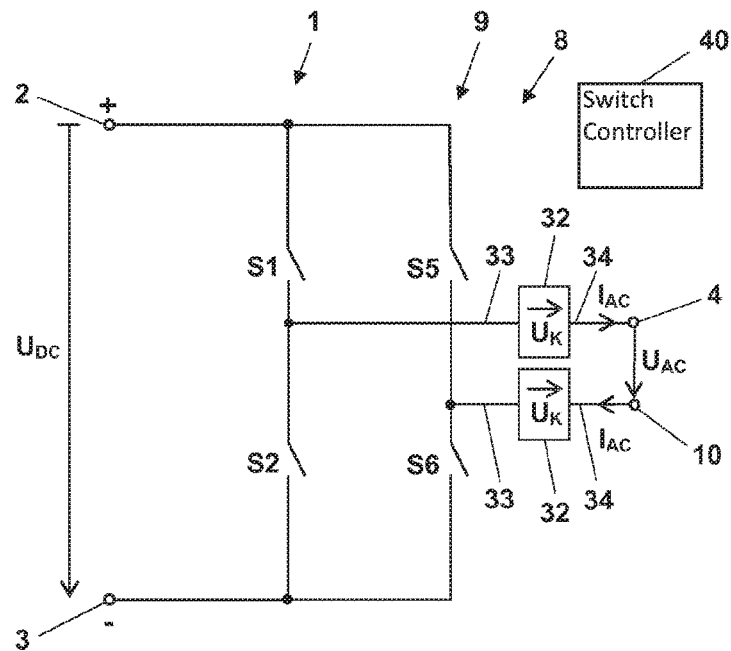
FIGS. 1a-1d show various embodiments of unfolding bridges according to the disclosure.

In the unfolding bridge illustrated in FIG. 1a-1d, a half-bridge 1 is arranged between two input terminals 2 and 3 between which a direct voltage $U_{DC}$ is present. The half-bridge 1 comprises a first bridge switch S1 between the input terminal 2 and an output terminal 4, and a second bridge switch S2 between the input terminal 3 and the output terminal 4, and connects the input terminals 2 and 3 alternately with the output terminal 4. In addition to the half-bridge 1, a further half-bridge 9 is arranged between the input terminals 2 and 3 in order to connect a further output terminal 10 alternately with the input terminals 2 and 3. The further half-bridge 9 comprises a first further bridge switch S5 between the input terminal 2 and the further output terminal 10, as well as a second further bridge switch S6 between the input terminal 3 and the further output terminal 10. An alternating voltage $U_{AC}$ is output between the output terminal 4 and the further output terminal 10, while an alternating current $I_{AC}$ flows at the output terminals 4, 10.

Figure 1B:
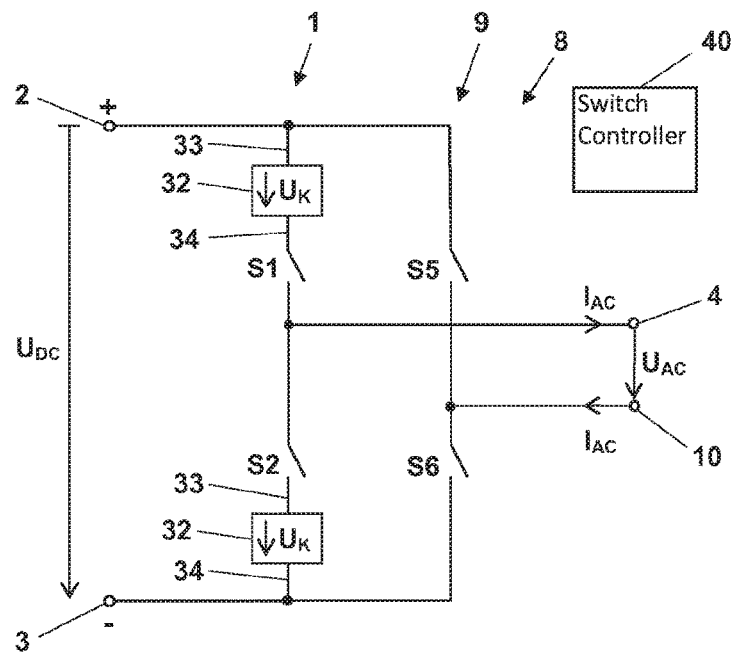
Figure 1C:
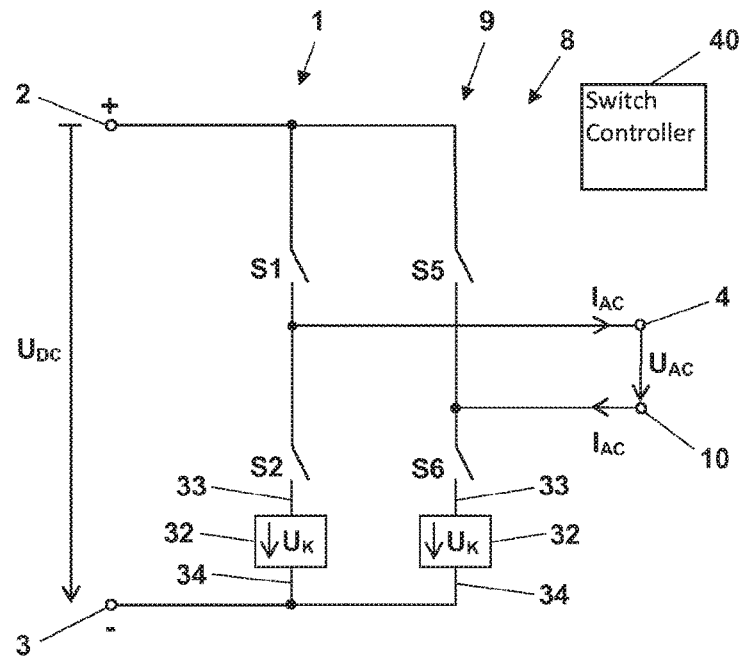

Two reverse voltage compensators 32 with their terminals 33, 34 are arranged in each case between the first input terminal 2 or the second input terminal 3 and the output terminal 4 or the further output terminal 10 in the embodiments according to FIG. 1a-1c. In principle, a plurality of possibilities appear for the arrangement. For example, as in FIG. 1a, a reverse voltage compensator 32 can be arranged between each of the bridge switches S1, S2, S5, S6 and the output terminals 4, 10 that are connected to each of the bridge switches S1, S2, S5, S6. The reverse voltage compensators can, however, also be arranged between the bridge switches S1, S2, S5 and S6 and the input terminals 2, 3, for example as in FIG. 1b within a half-bridge 1 in each case between the bridge switches S1, S2 and the input terminals 2, 3 or, as in FIG. 1c in each case in one of the half-bridges 1, 9 between the bridge switches S2, S6 and in each case the same input terminal 3.

The arrangements of reverse voltage compensators 32 between bridge switches S1, S2, S5, S6 and output terminals 4, 10 illustrated in FIGS. 1b and 1c here are only exemplary. The reverse voltage compensators 32 can equally well be arranged within the further half-bridge 9 instead of within the half-bridge 1 as in FIG. 1b, and between the bridge switches S1, S5 and the input terminal 2 instead of between the bridge switches S2, S6 and the input terminal 3 as in FIG. 1c.

It is further also possible to arrange a reverse voltage compensator 32 between the bridge switches S1, S2, S5, S6 and the output terminal 4, 10 respectively connected with the bridge switches S1, S2, S5, S6, and a further reverse voltage compensator 32 between one of the bridge switches S1, S2, S5, S6 and the respective input terminal 2, 3 connected with the bridge switches S1, S2, S5, S6, provided that a reverse voltage compensator 32 is arranged in the current path between the input terminals 2, 3 through the bridge switch S1, the output terminals 4, 10 and the bridge switch S6, and also in the current path between the input terminals 2, 3 through the bridge switch S5, the output terminals 4, 10 and the bridge switch S2.

Figure 1D:
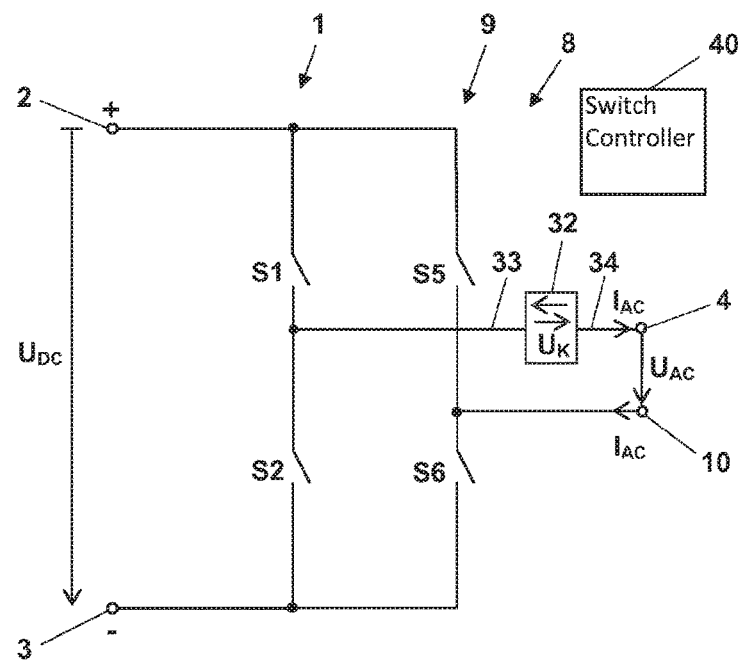

Two reverse voltage compensators 32 are provided in FIGS. 1a-1c. It is equally well possible, as illustrated in FIG. 1d, to provide only one reverse voltage compensator 32, provided this is simultaneously located both in the current path between the input terminals 2, 3 via the bridge switch S1, the output terminals 4, 10 and the bridge switch S6, as well as in the current path between the input terminals 2, 3 via the bridge switch S5, the output terminals 4, 10 and the bridge switch S2. It is also possible to provide more than two reverse voltage compensators 32, for example four or six, whereby the respective arrangements of the reverse voltage compensators 32 between bridge switches S1, S2, S5, S6 and input terminals 2, 3 or output terminals 4, 10 result corresponding to the arrangements of the individual reverse voltage compensators 32 in FIGS. 1a-1c.

The bridge switches S1, S2, S5, S6 of the unfolding bridge 8 are driven by a switch controller 40 such that the switch S1 is closed together with the switch S6, or the switch S2 together with the switch S5. Through a change between these two forms of the connection of the output terminals 4 and 10 with the input terminals 2 and 3, the polarity of the input terminals 2 and 3 with respect to the output terminals 4 and 10 is reversed. The reverse voltage compensators 32 are selectively activated by the switch controller 40, so that they shift the electrical potential of the respective input terminals 2, 3 with respect to the respective output terminal 4, 10, between which the respective reverse voltage compensator 32 is arranged, by a compensation voltage $U_k$ dropped across the reverse voltage compensator 32. In this way an arithmetic sign of the alternating voltage $U_{AC}$ that is temporarily negative in relation to an AC output via the output terminal 4 can be compensated for such that a current flowing out of the input terminal 2 flows in the direction given by the direct voltage $U_{DC}$ present between the input terminals 2 and 3 in spite of the negative instantaneous value of the alternating voltage $U_{AC}$. Reactive power can thus be output via the unfolding bridge 8 to the output terminals 4, 10, without the direct current flowing between the input terminals 2 and 3 and the direct voltage $U_{DC}$ present between them ever resulting in arithmetic signs that are opposed to one another.

Various embodiments of reverse voltage compensators 32 for the provision of a compensation voltage $U_K$ are illustrated in FIGS. 2a-2g. In a first embodiment according to FIG. 2a, the reverse voltage compensator 32 can be formed of a series circuit of an ohmic resistor 35 and an activation switch S3 with an additional switch S7 connected in parallel with the series circuit. The reverse voltage compensator 32 is activated by closing the activation switch S3, while at the same time a direct connection between the terminals 33, 34 of the reverse voltage compensator 32, which otherwise would be present, is disconnected with the additional switch S7. Through the complimentary switching of the switches S3 and S7, the compensation voltage $U_K$ can thus selectively be connected to or disconnected from the terminals 33, 34 of the reverse voltage compensator 32. The desired potential shift however only appears with a current actually flowing through the ohmic resistor. It is, in particular, disadvantageous that additional losses arise through the ohmic resistor. On the other hand it is advantageous that the polarity of the compensation voltage $U_K$ changes with the direction of the flow of current through the ohmic resistor, so that with this embodiment of the reverse voltage compensator 32, unfolding bridges 8 according to the disclosure can be realized with only a single reverse voltage compensator 32.

In a further embodiment according to FIG. 2b, a choke 36 is used instead of the ohmic resistor 35 in FIG. 2a. In this embodiment of the reverse voltage compensator 32, the desired potential shift again only occurs with a current actually flowing through the choke 36, and a polarity of the compensation voltage $U_K$ results that changes with the direction of the flow of current through the choke 36. It is, however, disadvantageous that the current form of the alternating current $I_{AC}$ that is output occurring at the output terminals 4, 10 is influenced by the choke 36.

In the embodiment of the reverse voltage compensator 32 according to FIG. 2c, the compensation voltage $U_K$ is provided by a capacitor C3 charged up to this voltage. A charging of the capacitor C3 can, for example, be effected through temporarily closing the switch S3 in association with the bridge switches respectively located in series with them. An uncontrolled discharge of the capacitor C3 is prevented by a discharge blocking diode D3 connected in series with the capacitor C3, wherein in particular what is of concern is a discharge via the opened activation switch S3, which typically is formed as a semiconductor switch that only blocks unidirectionally when in the open state. When the activation switch S3 is closed, i.e. when the reverse voltage compensator 32 is active, the capacitor C3 continues to be charged beyond the desired value of the compensation voltage $U_K$. In order to remove this additional charge again regularly, a discharge circuit, not illustrated explicitly in FIG. 2c, is provided, which permits a controlled discharge of the capacitor C3. In the embodiment of the reverse voltage compensator 32, it is advantageous that the compensation voltage $U_K$ is present at the terminals 33, 34 immediately upon activation of the reverse voltage compensator 32, and remains approximately constant during the activated state if the capacitance of the capacitor C3 is suitably large.

FIG. 2d shows a embodiment of the reverse voltage compensator 32 with a variable impedance 37 which can be adjusted to a specific impedance value by a control input, not illustrated here. Exemplary practical realizations of such a variable impedance 37 are illustrated in the form of semiconductor switches 38 in FIG. 2e and FIG. 2f. The semiconductor switches 38 can be driven via their control terminal 39 to a compensation voltage $U_K$ dropped between the terminals 33, 34. An activation of the reverse voltage compensator 32 by the switch controller 40 of the unfolding bridge 8 is then implemented through driving of the semiconductor switch 38 to the desired compensation voltage $U_K$ dropped across it. Thus here, advantageously, an activation switch S3 and an additional switch S7, as in the embodiments of the reverse voltage compensator 32 in FIGS. 2a-2c, are not required. As a resulting further advantage, the compensation voltage $U_K$ can be adjusted by the control terminal to any desired value, and also in the activated state can be adjusted at any time to a reverse voltage to be compensated that is present at the time.

Figure 2G:
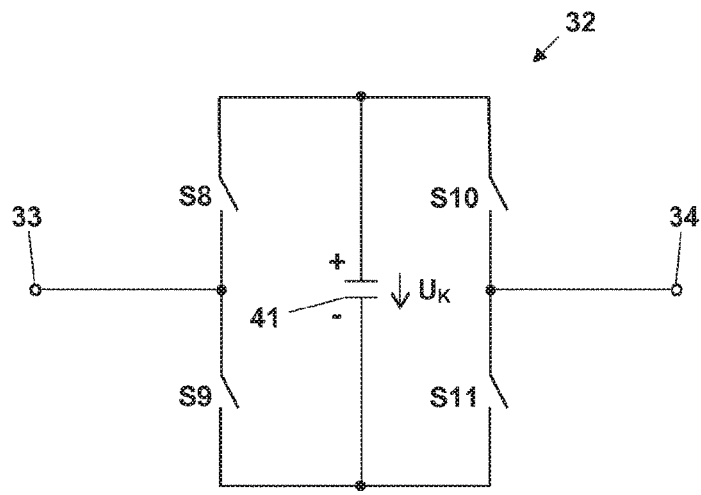

In the embodiment illustrated in FIG. 2g, the reverse voltage compensator 32 is designed as a full-bridge circuit formed of activation switches S8, S9, S10 and S11, whereby the compensation voltage $U_K$ present at a capacitor 41 can be made available at the terminals 33 and 34 of the reverse voltage compensator 32 with a positive polarity by closing the activation switches S8 and S11 and with a negative polarity by closing the activation switches S9 and S10. This embodiment is particularly suitable for an unfolding bridge according to the disclosure with only a single reverse voltage compensator 32, as is illustrated, for example, in FIG. 1d. Through simultaneously closing the activation switches S8 and S10 or S9 and S11, the reverse voltage compensator 32 is deactivated. In addition, in the embodiment according to FIG. 2g, no discharge circuit is necessary for the capacitor 41, since with the activation switches S8 and S11 or S9 and S10 being closed, the capacitor is discharged in cases in which a flow of current through the reverse voltage compensator 32 is opposed to the compensation voltage $U_K$. A deliberate charging or discharging of the capacitor 41 can thus be achieved through an appropriate driving of the activation switches S8, S9, S10 and S11.

Figure 3:
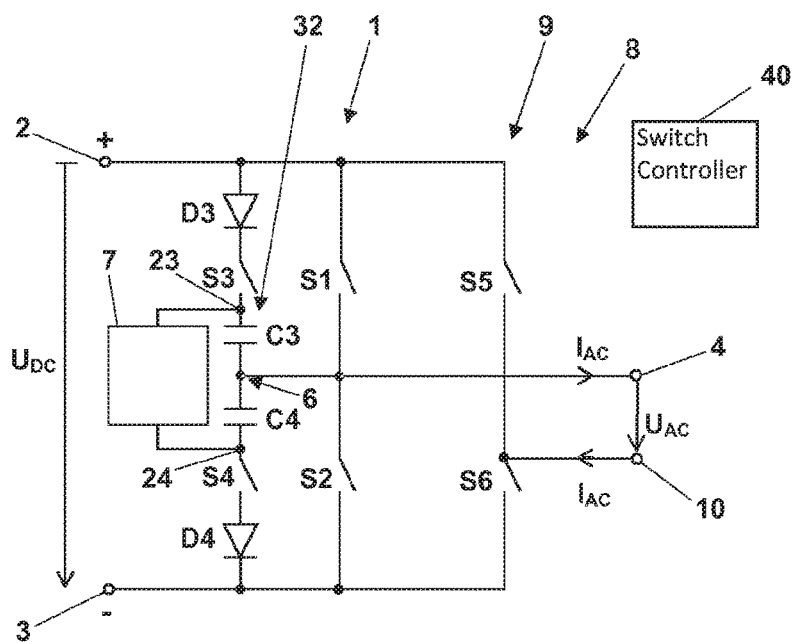
FIG. 3 shows an embodiment of an unfolding bridge according to the disclosure.

A concrete embodiment of an unfolding bridge 8 according to the disclosure with an arrangement of reverse voltage compensators 32 as in FIG. 1b is illustrated in FIG. 3, wherein the reverse voltage compensators 32 according to the embodiment of FIG. 2c are designed with a first activation switch S3, a first capacitor C3 and a first discharge blocking diode D3 for the first capacitor C3, as well as a second activation switch S4, a second capacitor C4 and a second discharge blocking diode D4 for the capacitor C4. The additional switches of the reverse voltage compensators 32 are formed in this case through the bridge switches S1 and S2 of the half-bridge 1. The capacitors C3 and C4 are arranged first following a branch 6 of the output terminal 4 to the two input terminals 2 and 3. A discharge circuit 7 is connected between the respective capacitor C3 and C4 and the associated activation switch S3 and S4 respectively, with which the two capacitors C3 and C4 can be discharged when required. An uncontrolled discharge of the capacitors C3 and C4 is prevented by the discharge blocking diodes D3 and D4, wherein, as has already been explained, a discharge through the opened switches S3 and S4, which typically are formed as semiconductor switches that only block unidirectionally when in the open state, is particularly of concern.

If the capacitors C3 and C4 are charged up to a compensation voltage with the polarities indicated in FIG. 3, which can, for example, be effected by temporarily closing the switches S3 and S4, then a connection, for example, of the output terminal 4 with the input terminal 2 via the switch S3 instead of via the switch S1 results in the potential of the input terminal 2 being shifted with respect to the output terminal 4 by the compensation voltage present over the capacitor C3. In this way the capacitors C3 and C4 act as a reverse voltage compensator 32 which compensates for the reverse voltages between the output terminals 4 and the respective input terminal 2, 3 which are in the opposite direction to a flow of current from the respective input terminal 2, 3 to the output terminal 4.

The bridge switches S1 to S6 of the unfolding bridge 8 are driven by the switch controller 40 such that the one of the two switches S1 and S3 is closed together with the switch S6, or one of the two switches S2 and S4 is closed together with the switch S5. Through a change between these two forms of the connection of the output terminals 4 and 10 with the input terminals 2 and 3, the polarity of the input terminals 2 and 3 with respect to the output terminals 4 and 10 is reversed. Provided that the switch S3 is closed instead of the switch S1, and that the switch S4 is closed instead of the switch S2, the potential shift, already explained with reference to FIG. 1, of the direct voltage $U_{DC}$ between the input terminals 2 and 3 with respect to the alternating voltage $U_{AC}$ between the output terminals 4 and 10 occurs.

Figure 4:
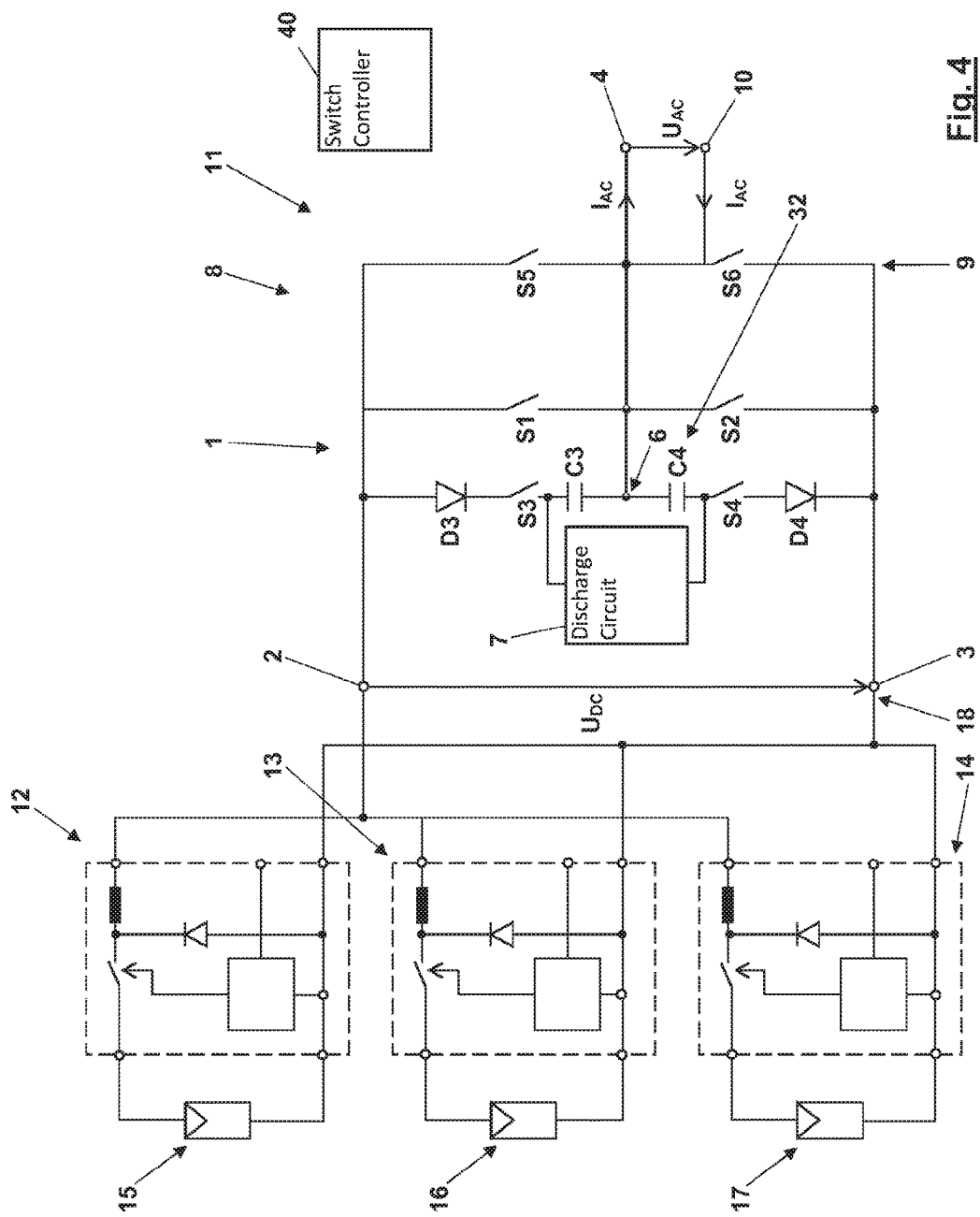
FIG. 4 shows an inverter according to the disclosure.

The inverter 11 illustrated in FIG. 4 comprises the unfolding bridge 8 according to FIG. 3. A plurality of DC/DC converters 12 to 14, each sketched here as step-down converters, are in this case connected in parallel to the input terminals 2 and 3. Separate photovoltaic generators 15 to 17 are connected through the DC/DC converters 12 to 14 to a DC link circuit 18 formed between the input terminals 2 and 3. This DC link circuit 18 can also, like the DC/DC converter, comprise additional capacitors, not illustrated. The individual DC/DC converters are simple single-quadrant converters which output, synchronously to one another, a pulsed direct current via the DC link circuit 18. The individual DC/DC converters 12 to 14 are in this case, for example, driven such that they maintain a working point of the respectively connected photovoltaic generator 15 to 17 at the so-called MPP, the maximum power point, in order to maximize the power generated by the photovoltaic generators 15 to 17. The pulsed direct current flowing by the DC link circuit 18 is converted by the unfolding bridge 8 to an alternating current between the output terminals 4 and 10, in that, after each pulse, i.e. after each half-wave of the pulsed direct current, the polarity of the input terminals 2 and 3 is reversed with respect to the output terminals 4 and 10. An alternating current is thus fed through the unfolding bridge 8 into an AC grid connected to the output terminals 4 and 10.

Figure 5:
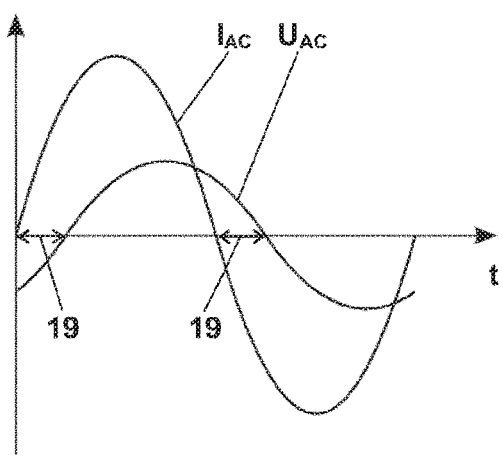
FIG. 5 shows the progression of an alternating current and an alternating voltage at an alternating current output of an inverter according to the disclosure.

FIG. 5 shows the curve of the alternating current $I_{AC}$ against the curve of the alternating voltage $U_{AC}$ between the output terminals 4 and 10 with a phase shift with the alternating current $I_{AC}$ leading the alternating voltage $U_{AC}$. As a result of the phase shift, periods of time 19 in which the alternating voltage $U_{AC}$ has a different arithmetic sign from the alternating current $I_{AC}$ between the output terminals 4 and 10 occur. A reversal of the polarity of the output terminals 4 and 10 with respect to the input terminals 2 and 3 at the zero crossings of the alternating current $I_{AC}$, which is sketched in FIG. 6, does therefore immediately lead to the pulsating direct current $I_{DC}$ through the DC link circuit 18, but also fundamentally to voltage steps 20 with the change of the arithmetic sign of the voltage $U_Z$ present at the DC link circuit 18, i.e., without countermeasures it would no longer be a direct voltage. This is compensated for in that, at least during the time periods 19, the voltage $U_Z$ is raised by the compensation voltage $U_K$ which is present at the capacitor C3 or C4, so that the direct voltage $U_{DC}$ results without a change in arithmetic sign. The compensating voltage $U_K$ can also remain activated for longer than the period of time 19, so that the direct voltage $U_{DC}$ then does not return to zero, but to a value that lies above zero. This is suggested in FIG. 6 by dotted lines.

Figure 7:
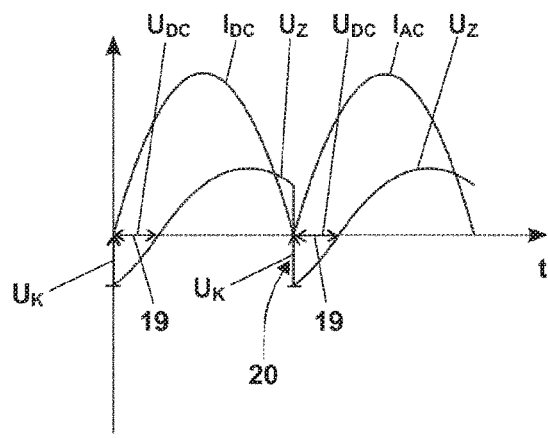
FIG. 7 shows the progression of a pulsed direct current above and the progression of a direct voltage at a DC link circuit of an inverter according to the disclosure with adaptively adjusted compensation voltage.

As was explained in association with the descriptions of the reverse voltage compensator 32 as a variable impedance according to FIGS. 2d-2f, this enables these embodiments to adjust the compensation voltage $U_K$ adaptively to a reverse voltage that is present. Through this, as illustrated in FIG. 7, through adaptive adjustment of the compensation voltage $U_K$, the voltage $U_{DC}$ present as a result at the DC link circuit 18 during the periods of time 19 in which the reverse voltage is present is set to a constant value of zero or alternatively to a constant value located above zero.

Figure 6:
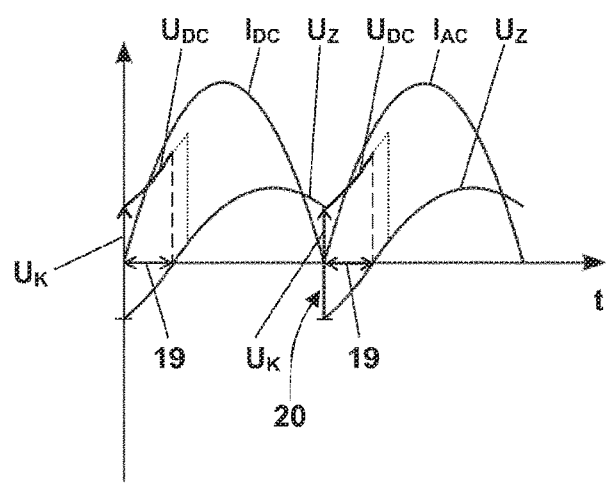
FIG. 6 shows the progression of a pulsed direct current above and the progression of a direct voltage at a DC link circuit of an inverter according to the disclosure.
Figure 8:
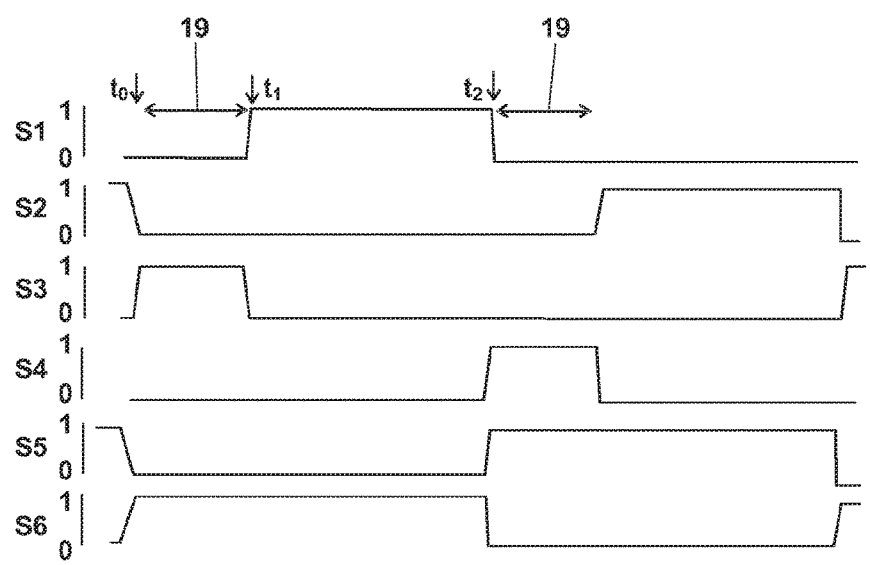
FIG. 8 Illustrates the driving of switches of an unfolding bridge of an inverter according to the disclosure.

FIG. 8 illustrates the drive of the switches S1 to S6 of the unfolding bridge 8 of the inverter 11 according to FIG. 4 in order to achieve the direct voltage $U_{DC}$ between the input terminals 2 and 3 according to FIG. 6. At a zero crossing of the alternating current $I_{AC}$ at the time $t_0$, initially, for the period of time 19, the switch S3 is closed in addition to the switch S6. At a time $t_1$ after the period of time 19, a changeover is made from the switch S3 to the switch S1, i.e. to a direct connection, without compensation voltage, between the output terminal 4 and the input terminal 2. At the time $t_2$ following a half-wave of the alternating current $I_{AC}$, i.e. at the next zero crossing, the switches S1 and S6 are opened, and instead the switch S5 is first closed together with the switch S4. After the period of time 19, a changeover is then made from the switch S4 to the switch S2. A direct voltage $U_{DC}$ between the input terminals 2 and 3 according to FIG. 7 can also be achieved by a control of the switches S1 to S6 of the unfolding bridge 8 according to FIG. 8, wherein, during the periods of time 19 in which in FIG. 8 the switch S3 or S4 is switched on, the reverse voltage compensator 32 according to the embodiments in FIGS. 2d-f is adaptively driven to a compensation voltage $U_K$ having the magnitude of the reverse voltage present at that time. The arrangement of the reverse voltage compensators 32 according to the embodiments in FIGS. 2d-f is not in this case restricted to one specific one of the arrangements described in connection with FIGS. 1a-d.

Figure 9:
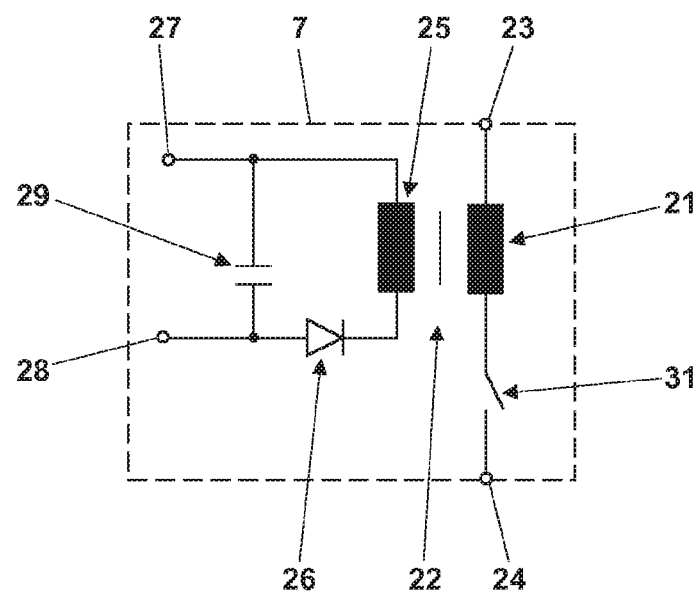
FIG. 9 illustrates a embodiment of a discharge circuit of an unfolding bridge according to the disclosure or of an inverter according to the disclosure.

FIG. 9 shows a possible embodiment of the discharge circuit 7. This is a flyback converter with a switch 31 which is connected in series with a primary winding 21 of a transformer 22 between input terminals 23 and 24 of the discharge circuit 7. A secondary winding 25 of the transformer 22 is connected in series with a rectifier diode 26 between output terminals 27 and 28 of the flyback converter, between which a smoothing capacitor 29 is arranged. The flyback converter outputs a direct current at the output terminals 27 and 28, which is electrically isolated from the voltage between the input terminals 23 and 24, and with which, for example, the DC link circuit of an on-board power supply of the inverter 11, or an input-side DC link circuit of one of the DC/DC converters 12 to 14, can be charged.

The invention claimed is:

1. An unfolding bridge having reactive power capability, comprising:
    a half-bridge with a first input terminal, a second input terminal, and an output terminal, the half-bridge comprising a first bridge switch connected between the first input terminal and the output terminal and a second bridge switch connected between the second input terminal and the output terminal;
    a further half-bridge comprising a first further bridge switch connected between the first input terminal and a further output terminal and a second further bridge switch connected between the second input terminal and the further output terminal;
    a switch controller configured to control operation of the bridge switches, wherein the switch controller is configured to reverse a connection of the output terminals with the input terminals via the bridge switches at a zero crossing of an alternating current flowing at the output terminals; and
    at least one reverse voltage compensator arranged in one or more of a current path between the input terminals via the first bridge switch, the output terminals, and the second further bridge switch, and in a current path between the input terminals, via the first further bridge switch, the output terminals, and the second bridge switch, wherein the at least one reverse voltage compensator is configured to shift the electrical potential of the respective input terminal with respect to the respective output terminal between which the reverse voltage compensator is arranged by a compensation voltage that is dropped across the reverse voltage compensator, and thereby compensates for a reverse voltage being opposite to the flow of current in the current path in which the reverse voltage compensator is arranged.

2. The unfolding bridge having reactive power capability as claimed in claim 1, wherein the reverse voltage compensator is connected in series with one of the bridge switches.

3. The unfolding bridge having reactive power capability as claimed in claim 2, wherein the reverse voltage compensator is arranged between the bridge switches and the respective output terminal.

4. The unfolding bridge having reactive power capability as claimed in claim 1, wherein the reverse voltage compensator is configured as a structure exhibiting a variable impedance.

5. The unfolding bridge having reactive power capability as claimed in claim 4, wherein the structure exhibiting the variable impedance comprises a semiconductor switch operating in linear mode, or a transistor driven to a voltage drop occurring across it having the magnitude of the compensation voltage.

6. The unfolding bridge having reactive power capability as claimed in claim 5, wherein the semiconductor switch comprises one of the bridge switches.

7. The unfolding bridge having reactive power capability as claimed in claim 1, wherein the reverse voltage compensator comprises a series circuit comprising an ohmic resistor or a choke and an activation switch, and an additional switch connected in parallel to the series circuit.

8. The unfolding bridge having reactive power capability as claimed in claim 7, wherein the additional switch comprises one of the bridge switches.

9. The unfolding bridge having reactive power capability as claimed in claim 1, wherein the reverse voltage compensator comprises a series circuit of a capacitor configured to be charged to the compensation voltage and an activation switch, and an additional switch connected in parallel to the series circuit, wherein a discharge blocking diode is connected in series with the capacitor.

10. The unfolding bridge having reactive power capability as claimed in claim 9, further comprising a discharge circuit configured to discharge the capacitor, wherein the discharge circuit is configured to establish a predefined base value of the compensation voltage when the activation switch is open.

11. The unfolding bridge having reactive power capability as claimed in claim 9, wherein the additional switch comprises one of the bridge switches.

12. The unfolding bridge having reactive power capability as claimed in claim 11, wherein the reverse voltage compensator comprises a first capacitor configured to be charged to a first compensation voltage connected with a first activation switch between the first input terminal and the output terminal, and a second capacitor configured to be charged to a second compensation voltage connected with a second activation switch between the second input terminal and the output terminal.

13. The unfolding bridge having reactive power capability as claimed in claim 12, wherein the switch controller is configured to close either one of the bridge switches or one of the activation switches that are arranged between the output terminal and a respective one of the input terminals in order to connect the output terminal to the respective one of the input terminals.

14. The unfolding bridge having reactive power capability as claimed in claim 1, wherein the reverse voltage compensator comprises a full-bridge circuit, a capacitor connected to the input switches of the full bridge circuit, wherein the compensation voltage is provided at the output terminals of the full bridge circuit.

15. An inverter with an unfolding bridge having reactive power capability, comprising:
   a half-bridge with a first input terminal, a second input terminal, and an output terminal, the half-bridge comprising a first bridge switch connected between the first input terminal and the output terminal and a second bridge switch connected between the second input terminal and the output terminal;
   a further half-bridge comprising a first further bridge switch connected between the first input terminal and a further output terminal and a second further bridge switch connected between the second input terminal and the further output terminal;
   a switch controller configured to control operation of the bridge switches, wherein the switch controller is configured to reverse a connection of the output terminals with the input terminals via the bridge switches at a zero crossing of an alternating current flowing at the output terminals; and
   at least one reverse voltage compensator arranged in one or more of a current path between the input terminals via the first bridge switch, the output terminals, and the second further bridge switch, and in a current path between the input terminals, via the first further bridge switch, the output terminals, and the second bridge switch, wherein the at least one reverse voltage compensator is configured to shift the electrical potential of the respective input terminal with respect to the respective output terminal between which the reverse voltage compensator is arranged by a compensation voltage that is dropped across the reverse voltage compensator, and thereby compensates for a reverse voltage being opposite to the flow of current in the current path in which the reverse voltage compensator is arranged.

16. The inverter as claimed in claim 15, further comprising:
   at least one input-side DC/DC converter connected upstream of the unfolding bridge for forming a direct current pulsed in half-waves.

17. The inverter as claimed in claim 16, wherein at an input side a plurality of DC/DC converters are connected with their respective outputs to a common DC link circuit connected to the first and the second input terminal.

18. The inverter as claimed in claim 17, wherein a separate photovoltaic generator is connected to each input-side DC/DC converter, wherein the respective DC/DC converter is configured to specify the working point of the photovoltaic generator connected to it.

19. The inverter as claimed in claim 15, wherein the reverse voltage compensator comprises:
   a series circuit comprising an ohmic resistor or a choke and an activation switch, and an additional switch connected in parallel to the series circuit, or
   a series circuit of a capacitor configured to be charged to the compensation voltage and an activation switch, and an additional switch connected in parallel to the series circuit, wherein a discharge blocking diode is connected in series with the capacitor,
   wherein the switch controller is configured to reverse the connection of the two output terminals with the two input terminals at each zero crossing of the alternating current flowing between the output terminals, and wherein the switch controller is further configured to close the activation switch instead of the additional switch of the reverse voltage compensator during periods of time in which an alternating voltage between the output terminals has a different arithmetic sign to the alternating current.

20. The inverter as claimed in claim 15, wherein the reverse voltage compensator is configured as a structure exhibiting a variable impedance, wherein the switch controller is configured to reverse the connection of the two output terminals with the two input terminals at each zero crossing of the alternating current flowing between the output terminals and configured to drive the variable impedance to a voltage drop occurring across it having the magnitude of the compensation voltage during periods of time in which an alternating voltage between the output terminals has a different arithmetic sign to the alternating current.

21. A polarity-reversing method for the alternating connection of two poles of a DC link circuit with output terminals of an AC output at which an alternating voltage is present, in order to output an alternating current with a phase shift with respect to the alternating voltage via the AC output, wherein the connection of the output terminals of the AC output with the poles of the DC link circuit is reversed at the zero crossing of the alternating current, comprising:
   directly connecting the AC output with the DC link circuit when the alternating current and the alternating voltage have the same arithmetic sign,
   whereas when the arithmetic signs of the alternating current and the alternating voltage are opposite to one another, the AC output is connected to the DC link circuit via a reverse voltage compensator shifting the electrical potential of the pole of the DC link circuit with respect to the output terminal with which the pole is connected via the reverse voltage compensator by a compensation voltage dropped across it.

22. The polarity-reversing method as claimed in claim 21, wherein the reverse voltage compensator comprises a variable impedance driven to a voltage drop occurring across it having the magnitude of a compensation voltage.

23. The polarity-reversing method as claimed in claim 22, wherein the voltage drop arising across the reverse voltage compensator having the magnitude of a compensating voltage is adaptively adjusted to a reverse voltage present between one of the poles of the DC link circuit and one of the output terminals.

24. The polarity-reversing method as claimed in claim 21, further comprising charging a capacitor of the reverse voltage compensator to a compensation voltage.

25. The polarity-reversing method as claimed in claim 24, further comprising charging a first capacitor of the reverse voltage compensator to a first compensation voltage between the one pole of the DC link circuit and one of the output terminals of the AC output, and charging a second capacitor to a second compensation voltage between the other pole of the DC link circuit and the one of the output terminals of the AC output.

26. The polarity-reversing method as claimed in claim 25, further comprising discharging the first and second capacitors to a predetermined base value of the first and of the second compensation voltage when they are not connected to the DC link circuit.

* * * * *